(12) United States Patent
Nagata et al.

(10) Patent No.: US 11,418,246 B2
(45) Date of Patent: Aug. 16, 2022

(54) USER TERMINAL, BASE STATION APPARATUS AND RADIO COMMUNICATION METHOD

(71) Applicant: NTT DOCOMO, INC., Tokyo (JP)

(72) Inventors: Satoshi Nagata, Tokyo (JP); Huiling Li, Beijing (CN); Chongning Na, Beijing (CN); Huiling Jiang, Beijing (CN); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 628 days.

(21) Appl. No.: 16/317,994

(22) PCT Filed: Aug. 10, 2017

(86) PCT No.: PCT/JP2017/029220
§ 371 (c)(1),
(2) Date: Jan. 15, 2019

(87) PCT Pub. No.: WO2018/030540
PCT Pub. Date: Feb. 15, 2018

(65) Prior Publication Data
US 2021/0297137 A1    Sep. 23, 2021

(30) Foreign Application Priority Data

Aug. 11, 2016    (CN) .......................... 201610658464.0

(51) Int. Cl.
*H04B 7/02*       (2018.01)
*H04B 7/06*       (2006.01)
(Continued)

(52) U.S. Cl.
CPC ......... *H04B 7/0695* (2013.01); *H04B 7/0456* (2013.01); *H04W 16/28* (2013.01);
(Continued)

(58) Field of Classification Search
CPC ... H04B 7/0695; H04B 7/0456; H04W 16/28; H04W 72/0406; H04W 72/085; H04W 24/10; H04W 72/046
(Continued)

(56) References Cited

U.S. PATENT DOCUMENTS 5,592,490 A * 1/1997 Barratt .................. H01Q 1/246
                                                    370/310
6,058,105 A * 5/2000 Hochwald ............ H04B 7/0615
                                                    370/310
(Continued)

FOREIGN PATENT DOCUMENTS

| JP | H11-168453 A | 6/1999 |
| WO | 2015/005641 A1 | 1/2015 |
| WO | 2015147814 A1 | 10/2015 |

OTHER PUBLICATIONS

JP11168453-A (Jun. 22, 1999) machine translation.*
(Continued)

*Primary Examiner* — Helene E Tayong
(74) *Attorney, Agent, or Firm* — Osha Bergman Watanabe & Burton LLP (57) ABSTRACT

The present invention provides a user terminal that reports channel state information to base station apparatus in order to reduce the overhead of signaling required in beam measurements and to lower the complexity of beam measurements and calculation, and, in this user terminal, a receiving section that receives basis beam reference signals, each included in one or a plurality of basis beams transmitted from the base station, a determining section that determines a leading beam and a secondary beam to combine with the leading beam, based on the basis beam reference signals received, and a transmission section that transmits combi-
(Continued)

nation information about combination of the leading beam and the secondary beam to the base station apparatus, are provided.

4 Claims, 4 Drawing Sheets

(51) Int. Cl.
    *H04B 7/0456*  (2017.01)
    *H04W 16/28*   (2009.01)
    *H04W 24/10*   (2009.01)
    *H04W 72/04*   (2009.01)
    *H04W 72/08*   (2009.01)

(52) U.S. Cl.
    CPC ....... *H04W 24/10* (2013.01); *H04W 72/0406* (2013.01); *H04W 72/046* (2013.01); *H04W 72/085* (2013.01)

(58) Field of Classification Search
    USPC .......................................... 375/267
    See application file for complete search history.

(56) References Cited

U.S. PATENT DOCUMENTS

| 2015/0009922 | A1* | 1/2015 | Hoshino | H04L 5/0035 370/329 |
| 2015/0009968 | A1 | 1/2015 | Yu et al. | |
| 2015/0049824 | A1* | 2/2015 | Kim | H04B 7/0617 375/267 |
| 2015/0280802 | A1 | 10/2015 | Thomas et al. | |
| 2015/0341091 | A1* | 11/2015 | Park | H04B 7/0617 375/267 |
| 2016/0142117 | A1 | 5/2016 | Rahman et al. | |
| 2017/0086195 | A1* | 3/2017 | Yum | H04B 7/0626 |
| 2017/0222703 | A1 | 8/2017 | Thomas et al. | |

OTHER PUBLICATIONS

International Search Report issued in PCT/JP2017/029220 dated Oct. 31, 2017 (1 Page).
Written Opinion of the International Searching Authority issued in PCT/JP2017/029220 dated Oct. 31, 2017 (3 Pages).
Office Action issued in European Application No. 17839604.0, dated Jun. 30, 2020 (8 pages).
Extended European Search Report issued in counterpart European Patent Application No. 17839604.0, dated Sep. 6, 2019 (13 pages).
Office Action issued in Japanese Application No. 2018-533580 dated Oct. 26, 2021 (6 pages).
Intel Corporation "Beam combining codebook enhancements for Class B FD-MIMO" 3GPP TSG RAN WG1 Meeting #85, R1-164148, Nanjing, China, May 23-27, 2016 (5 pages).
Office Action issued in counterpart Chinese Application No. 201780025374.0 dated Jul. 2, 2021 (12 pages).
Office Action issued in Chinese Application No. 201780025374.0; dated Nov. 10, 2021 (16 pages).

* cited by examiner

USER TERMINAL, BASE STATION APPARATUS AND RADIO COMMUNICATION METHOD

TECHNICAL FIELD

The present invention relates to a user terminal, base station apparatus, and a radio communication method. More particularly, the present invention relates to a user terminal, base station apparatus and a radio communication method, to which a beam selection method and a beam determination method in a radio communication system can be applied.

BACKGROUND ART

Envisaging a successor system of the LTE system (also referred to as "LTE-Advanced" or "LTE-Advanced Pro," for example), a full-dimensional multi-input multi-output (FD-MIMO)/massive multi-input multi-output (massive MIMO) antenna has been proposed, which is a radio communication technology for LTE (Long Term Evolution), studied in 3GPP (3rd Generation Partnership Project). Compared to the conventional MIMO system, in the FD-MIMO/massive MIMO system, a base station can achieve improved system throughput by communicating data using more antennas as the number of mobile stations increases.

SUMMARY OF INVENTION

Technical Problem

Studies on beam selection methods and beam determining methods for use when transmitting data on beams to mobile stations are underway. According to conventional methods, a mobile station measures every beam, and feeds back the measurement results of CSI-RSs, contained in each beam, to a base station. Based on the feedback, the base station selects subsequent beams to transmit to the mobile station from a plurality of candidate beams. In order to enable the mobile station to measure the CSI-RSs contained in beams that follow, the base station transmits the channel state reference signals (CSI-RSs) for a plurality of candidate beams to the mobile station, statically or semi-statically, through RRC signaling. However, when the number of antennas increases, the overhead of signaling required in beam measurements grows, and, accompanying this, the complexity of beam measurements and calculation increases significantly, and therefore the conventional methods are not suitable for the massive MIMO system.

The present invention has been made in view of the above, and it is therefore an object of the present invention to provide a user terminal, base station apparatus and a radio communication method, whereby it is possible to reduce the overhead of signaling used in beam measurements, and lower the complexity of beam measurements and calculation.

Solution to Problem

One aspect of the present invention provides a user terminal that reports channel state information to base station apparatus, and that has a receiving section that receives basis beam reference signals, each included in one or a plurality of basis beams transmitted from the base station, a determining section that determines a leading beam and a secondary beam to combine with the leading beam, based on the received basis beam reference signals, and a transmission section that transmits combination information about combination of the leading beam and the secondary beam, to the base station apparatus.

Another aspect of the present invention provides a receiving section that receives combination information about combination of a leading beam and a secondary beam transmitted from a user terminal, and a beam determining section that determines a transmission beam for the user terminal, combining the leading beam and the secondary beam, based on the combination information received.

Advantageous Effects of Invention

According to the present invention, it is possible to provide a user terminal, base station apparatus and a radio communication method, whereby it is possible to reduce the overhead of signaling required in beam measurements and lower the complexity of beam measurements and calculation.

DESCRIPTION OF EMBODIMENTS

Now, methods of transmitting channel state information reference signals and base stations according to embodiments of the present invention will be described below with reference to the accompanying drawings. In the accompanying drawings, the same reference numerals will indicate the same elements throughout. It should be noted that the embodiments that will be described below are merely illustrative and should not be construed as limiting the scope of the present invention. Note that the UEs that will be described below may be various types of user terminals including, for example, mobile terminals (also referred to as "mobile stations") or stationary terminals, and, in the following description, "UEs" and "mobile stations" will be used interchangeably, for ease of description. Also, the base stations that will be described below may be various types of base station apparatus, including, for example, gNBs, and transmission points and so on.

Figure 1:
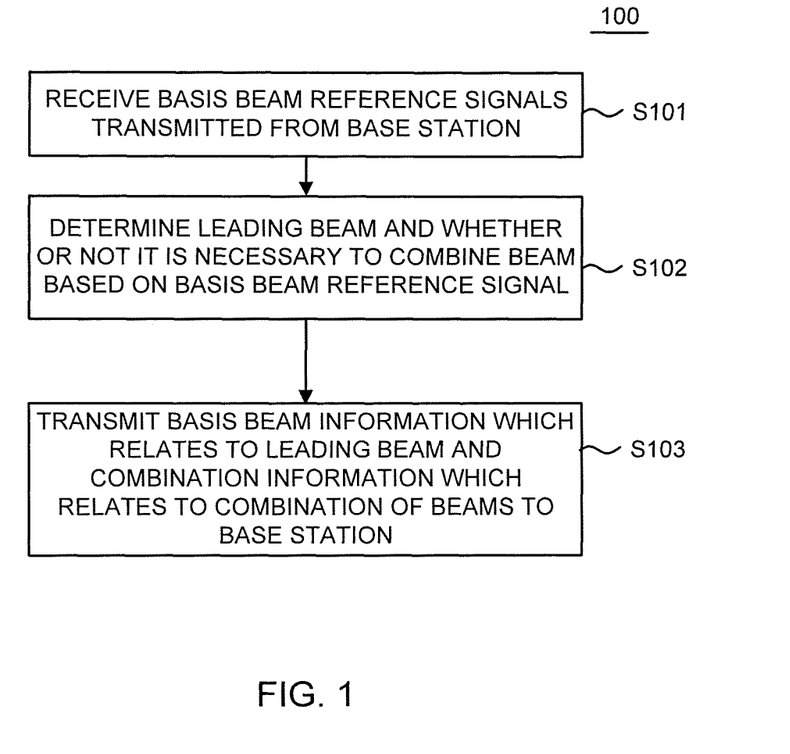
FIG. 1 is a flowchart to show the beam selection method that is applied to a mobile station, according to one embodiment of the present invention.

Now, the beam selection method executed by a mobile station according to an embodiment of the present invention will be described below with reference to FIG. 1. FIG. 1 is a flowchart to show the beam selection method that is applied to a mobile station according to one embodiment of the present invention. As shown in FIG. 1, in step S101, basis beam reference signals transmitted from a base station are received. According to one example of the present invention, the base station can generate multiple groups of beams, and each group of beams may be comprised of a plurality of basis beams. In step S101, basis beam reference signals for each basis beam in one group of beams are received. For example, a new codebook is created for basis beams which the base station can generate. Alternatively, basis beams which the base station can generate may be beams that correspond to existing codebooks (for example, codebooks in 3GPP standard release 13), which ensures excellent compatibility with existing codebooks.

In step S102, based on the basis beam reference signals, it is determined that whether or not it is necessary to combine a leading beam and another beam. For example, each basis beam's channel state and/or others are measured based on the basis beam reference signals, and, furthermore, based on the measurement results, the basis beam to show the best channel state among a plurality of basis beams corresponding to the basis beam reference signals is selected as a leading beam.

Note that, furthermore, whether or not it is necessary to combine the leading beam with another beam is determined based on the measurement results. For example, if the measurement result of a leading beam shows that the channel state of the beam fulfills a predetermined channel state threshold, in step S102, it is determined that there is no need to combine a beam. On the other hand, if the measurement result of a leading beam shows that the channel state of the beam does not reach the predetermined channel state threshold, in step S102, it is determined that a beam needs to be combined, so that a beam to show a more suitable channel state for beam-combining is acquired.

Then, in step S103, basis beam information, which relates to the leading beam, and combination information, which relates to the combination of a beam, are transmitted to the base station. According to one example of the present invention, basis beam information of the leading beam is the beam index of the leading beam.

Note that, for example, if, in step S102, it is determined that it is not necessary to combine a beam, in step S103, basis beam information that relates to the leading beam, and combination information to indicate that it is not necessary to combine a beam, are transmitted to the base station. Also, for example, if, in step S102, it is determined that a beam needs to be combined, in step S103, basis beam information that relates to the leading beam and combination information to indicate that a beam needs to be combined are transmitted to the base station.

According to another example of the present invention, when it is determined that it is necessary to combine a beam, the method shown in FIG. 1 may provide a secondary beam to combine with the leading beam, and also provide a combination coefficient for the secondary beam.

As mentioned earlier, the base station can generate a plurality of groups of beams. The secondary beam that is determined may be another basis beam in the same beam group as that of the leading beam. Alternatively, the secondary beam that is determined and the leading beam may belong to different beam groups, that is, the secondary beam may be a basis beam in another beam group.

Figure 2:
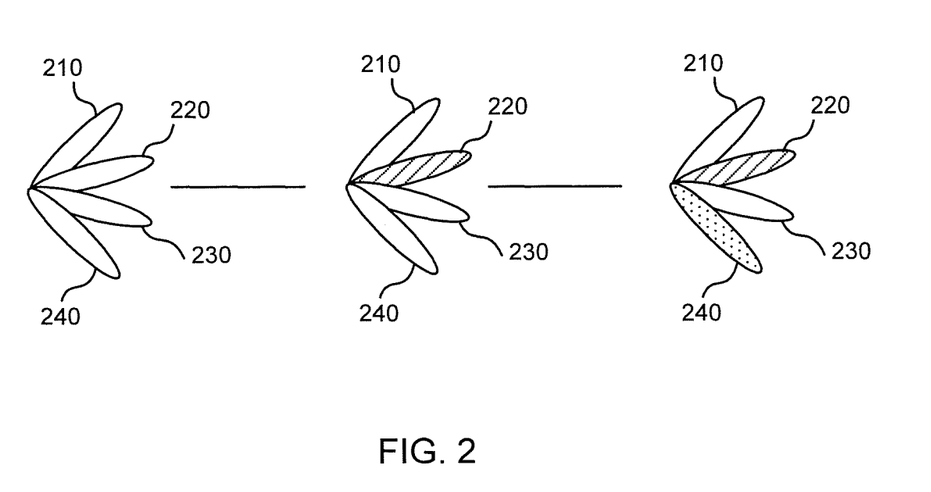
FIG. 2 is a schematic diagram to show how a leading beam and a secondary beam to combine with the leading beam are determined, according to one embodiment of the present invention.

FIG. 2 is a schematic diagram to show how a leading beam and a secondary beam to be combined with the leading beam are determined, according to one embodiment of the present invention. As shown in FIG. 2, a mobile station receives basis beam reference signals of one group of basis beams (that is, basis beams 210 to 240) transmitted from the base station. In step S102, as shown in the example of FIG. 2, it is determined that the basis beam 220 is a leading beam and that a beam needs to be combined. Note that, as shown in FIG. 2, the mobile station further determines to combine a beam, using the beam 240 in the same beam group as that of the basis beam 220.

Note that the combination coefficients of a secondary beam may be coefficients for adjusting the secondary beam when the secondary beam is combined with a leading beam. For example, the coefficients for adjusting the secondary beam may include an amplitude coefficient and a phase coefficient for adjusting the amplitude and the phase of the secondary beam. For example, based on equation 1 below, leading beam $b_0$ and secondary beam $b_i$ may be combined, and resulting beam $B_0$ may be fixed.

$$B_0 = b_0 + x_i e^{j\varphi_i} b_i \qquad \text{(Equation 1)}$$

Here, $x_i$ is the amplitude coefficient, and $\varphi_i$ is the phase coefficient.

Accordingly, the combination information related to combination of beams contains information about a secondary beam and its combination coefficients.

According to one example of the present invention, the combination information includes secondary beam information, which relates to a secondary beam to combine with a leading beam, and coefficient information, which relates to the secondary beam's combination coefficients. Similar to basis beam information that is associated with a leading beam, secondary beam information that is associated with a secondary beam may be the beam index of the secondary beam. Note that, for example, the coefficient information includes amplitude information and phase information. For example, the amplitude information represents the above-noted amplitude coefficient, and the phase information represents the above-noted phase coefficient.

In the present example, whether or not a beam needs to be combined may be indicated using the amplitude information, that is, to indicate whether or not it is necessary to combine a beam, another indicator, apart from the amplitude information, needs not be provided in the combination information. To be more specific, if it is determined that there is no need to combine a beam, the amplitude information is made zero. When a beam needs not be combined, there is no need to report a secondary beam and parameters for adjusting the secondary beam to the base station, in step S103, the mobile station transmits basis beam information and amplitude information, related to a leading beam, to the base station, thereby reporting, to the base station, a leading beam which the mobile station has selected, and to the effect that this leading beam needs not be combined with another beam. The mobile station does not have to transmit other pieces of information (for example, the secondary beam information and the phase coefficient) than the amplitude information in the combination information, to the base station. On the other hand, if it is necessary to combine a beam, in step S103, the mobile station transmits the basis beam information, secondary beam information, amplitude information and phase information related to the leading beam, to the base station.

In this example, preferably, in step S103, the amplitude information and information other than the amplitude information in the combination information may be transmitted, separately. For example, the amplitude information is first transmitted, and then information other than the amplitude information in the combination information is transmitted.

Therefore, the base station determines whether or not it is possible to receive information other than the amplitude information in the combination information, based on the amplitude information. Note that information other than the amplitude information in the combination information may be transmitted to the base station in a plurality of times. For example, the secondary beam information may be transmitted first, and then the phase information may be transmitted again.

According to another example of the present invention, the combination information includes combination indication information, which indicates whether or not it is necessary to combine a beam, secondary beam information, which relates to a secondary beam to combine with a leading beam, and coefficient information, which relates to combination coefficients of the secondary beam. When a beam needs not be combined, there is no need to report a secondary beam and parameters for adjusting the secondary beam to the base station, in step S103, the mobile station transmits basis beam information and combination indication information related to a leading beam, to the base station, thereby reporting, to the base station, a leading beam which the mobile station has selected, and to the effect that this leading beam needs not be combined with another beam. The mobile station does not have to transmit the combination information to the base station. On the other hand, if it is necessary to combine a beam, the mobile station transmits the basis beam information and combination indication information related to the leading beam, to the base station, and, furthermore, transmits secondary beam information and coefficient information (for example, amplitude information and phase information) to the base station.

In this example, preferably, in step S103, the combination indication information and information other than the combination indication information in the combination information may be transmitted, separately. For example, the combination indication information is transmitted first, and then information other than the combination indication information in the combination information is transmitted. Therefore, the base station determines whether or not it is possible to receive information other than the combination indication information in the combination information, based on the combination indication information. Note that information other than the combination indication information in the combination information may be transmitted to the base station in a plurality of times. For example, the secondary beam information and the amplitude information may be transmitted first, and then the phase information may be transmitted.

Note that, according to another example of the present invention, in step S103, the combination information is transmitted to the base station through a physical uplink control channel (PUCCH) and/or a physical uplink shared channel (PUSCH). Note that the combination information may be transmitted to the base station periodically or aperiodically, on an as-needed basis.

For example, the entire combination information is transmitted to the base station through the PUCCH. To be more specific, the combination information may be transmitted in the PUCCH by using a precoding matrix indicator (PMI). As mentioned earlier, the combination information includes some or all of combination indication information, secondary beam information, amplitude information and phase information. The whole of the combination information may be transmitted using one PMI, or the whole of the combination information may be transmitted using a plurality of PMIs. For example, the combination indication information and/or the secondary beam information in the combination information are transmitted using the first PMI, and other pieces of information in the combination information are transmitted using a second PMI. Alternatively, similar to the method using the PUCCH, the entire combination information may be transmitted to the base station using the PUSCH.

Furthermore, for example, a part of the information in the combination information may be transmitted to the base station using the PUCCH, and another part of the information in the combination information may be transmitted to the base station using the PUSCH. To be more specific, it is possible to transmit part of the information in the combination information to the base station through the PUCCH, and transmit part of the rest of the information in the combination information through the PUSCH. For example, when the combination information includes part or all of combination indication information, secondary beam information, amplitude information, phase information and others, the combination indication information and/or the secondary beam information in the combination information are transmitted through the PUCCH, and the rest of the information in the combination information is transmitted through the PUSCH.

Note that, in order to prevent a beam addressed to one mobile station and a beam addressed to another mobile station from colliding, the base station may report to the mobile station beams that are limited in use, by sending beam limiting information to the mobile station. In this case, the method shown in FIG. 1 includes receiving beam limiting information transmitted from the base station, the beam limiting information here indicates a beam whose use is limited, and next, a correlation coefficient between the secondary beam that is determined in step S102 and the limited beam indicated by the beam limiting information may be further determined. For example, correlation coefficient R(k) is determined based on following equation 2:

$$R(k) = \|B_0 b_k\| \qquad \text{(Equation 2)}$$

Here, $b_k$ represents the beam whose use is limited.

When the correlation coefficient is larger than a predetermined value, according to one example of the present invention, in step S103, basis beam information relating to a leading beam, and combination information indicating that a beam is not to be combined, are transmitted to the base station. Alternatively, according to another example of the present invention, the secondary beam to combine with a leading beam is re-selected, and the combination coefficients of the re-selected secondary beam are determined again. Accordingly, in step S103, basis beam information related to a leading beam, secondary beam information related to the secondary beam that is re-selected and coefficient information related to the combination coefficients of the re-selected secondary beam are transmitted to the base station.

The beam selection method according to the present embodiment allows determining a leading beam based on a basis beam reference signal first, then determining whether or not this leading beam needs to be combined with another beam, and feeding back the determined result to a base station. Consequently, even in the massive MIMO system with a larger number of antennas, the base station can acquire, in a reliable manner, the beams which the base station can use then and subsequently to communicate with a mobile station, without even allowing the signaling overhead for beam measurements to increase accompanying the increase of the number of antennas. Note that, if the basis beam is a beam that corresponds to an existing codebook, excellent compatibility with the existing codebook is ensured.

Note that, according to another example of the present invention, a plurality of leading beams may be determined in step S102. In this case, whether or not each leading beam needs to be combined with a beam is determined, and when a leading beam needs to be combined with a beam, a secondary beam to be combined with the leading beam and combination coefficients for the secondary beam may be determined.

Figure 3:
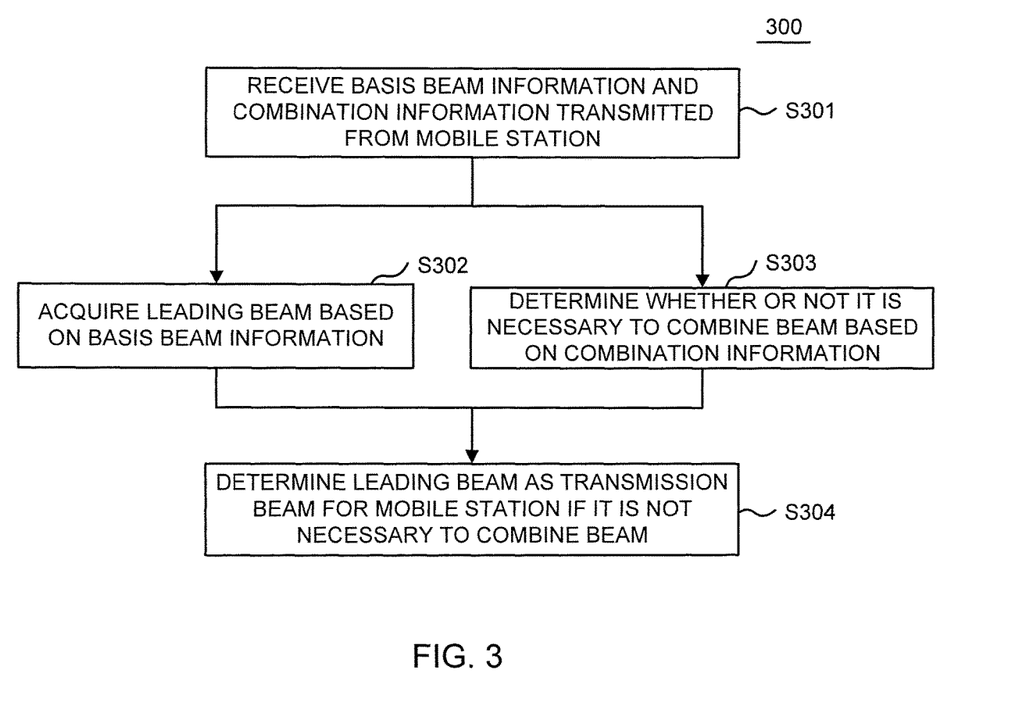
FIG. 3 is a flowchart to show the beam determination method that is executed by a base station, according to one example of the present invention.

Next, a beam determination method 300 that is executed by a base station according to an embodiment of the present invention will be described with reference to FIG. 3. FIG. 3 is a flowchart to show a beam determining method 300 executed by a base station according to one example of the present invention. As shown in FIG. 3, in step S301, the basis beam information and the combination information transmitted from the mobile station are received. For example, the basis beam information and the combination information are generated by the mobile station based on basis beam reference signals transmitted from the base station. The basis beam information and the combination information have been described above in detail, with reference to FIG. 1 and FIG. 2, and so their explanation will be omitted here.

In step S302, a leading beam is acquired based on the basis beam information, and, in step S303, whether or not it is necessary to combine a beam is determined based on the combination information. Then, in step S304, if it is not necessary to combine a beam, the leading beam is determined as the transmission beam for the mobile station. In the subsequent data transmission process, data is transmitted to the mobile station using the leading beam.

Figure 4:
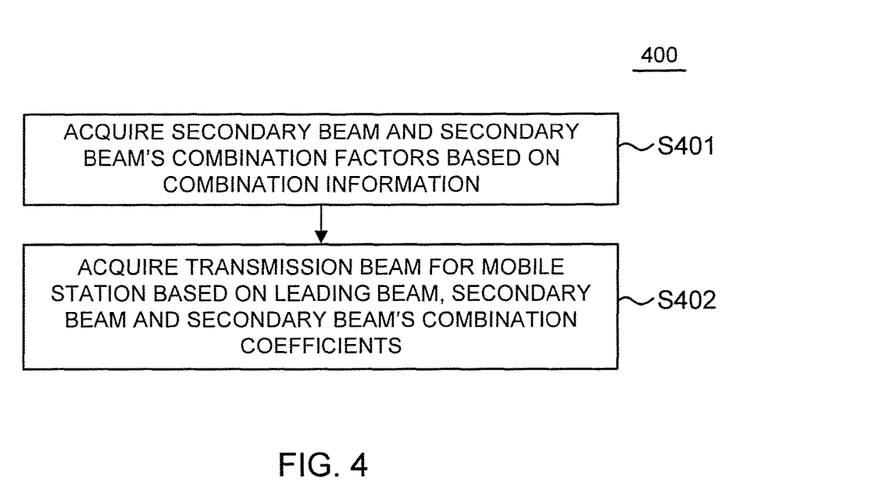
FIG. 4 is a flowchart to show the beam combining method that is executed by a base station according to one example of the present invention.

On the other hand, when it is necessary to combine a beam, the method of FIG. 3 may further include combining the leading beam with another beam. FIG. 4 is a flowchart to show a beam combination method 400 executed by a base station according to one example of the present invention. As shown in FIG. 4, in step S401, a secondary beam and combination coefficients of the secondary beam are acquired based on the combination information. Then, in step S402, a transmission beam for the mobile station is acquired based on the leading beam, the secondary beam and the combination coefficients of the secondary beam. As described above, the combination coefficients may include an amplitude coefficient and a phase coefficient. For example, according to equation 1 above, a transmission beam is acquired by combining a leading beam with a secondary beam.

As described earlier, in the combination information, the mobile station first transmits the information that indicates whether or not it is necessary to combine a beam, and when it is necessary to combine a beam, the mobile station may transmit the rest of the information in the combination information after sending the information indicating whether or not it is necessary to combine a beam. Accordingly, in step S301, the base station first receives the information to indicate whether or not it is necessary to combine a beam. If, in step S303, it is determined that it is not necessary to combine a beam, the base station determines that it is not necessary to receive the rest of the information in the combination information, and that it is not necessary to combine a beam based on the rest of the information in the combination information. On the other hand, if, in step S303, it is determined that a beam needs to be combined, the base station determines that it is necessary to receive the rest of the information in the combination information, and determines that it is necessary to combine a beam based on the rest of the information in the combination information.

Note that, preferably, the method illustrated in FIG. 3 may further include reporting beams that are limited in use, by sending beam limiting information to the mobile station, before the basis beam information and the combination information transmitted from the mobile station are received. The mobile station generates the basis beam information and the combination information taking into account the beam limiting information, so that a beam for the mobile station and a beam for another mobile station are prevented from colliding.

According to the beam determining method of the present embodiment, basis beam information and combination information, which are generated by a mobile station based on basis beam reference signals, are received, a leading beam and whether or not this leading beam needs to be combined with another beam are determined, and, furthermore, the transmission beam for this mobile station is determined. Consequently, even in the massive MIMO system with a larger number of antennas, the base station can acquire, in a reliable manner, the beams which the base station can use then and subsequently to communicate with a mobile station, without even allowing the signaling overhead for beam measurements to increase accompanying the increase of the number of antennas. Note that, if the basis beam is a beam that corresponds to an existing codebook, excellent compatibility with the existing codebook is ensured.

Figure 5:
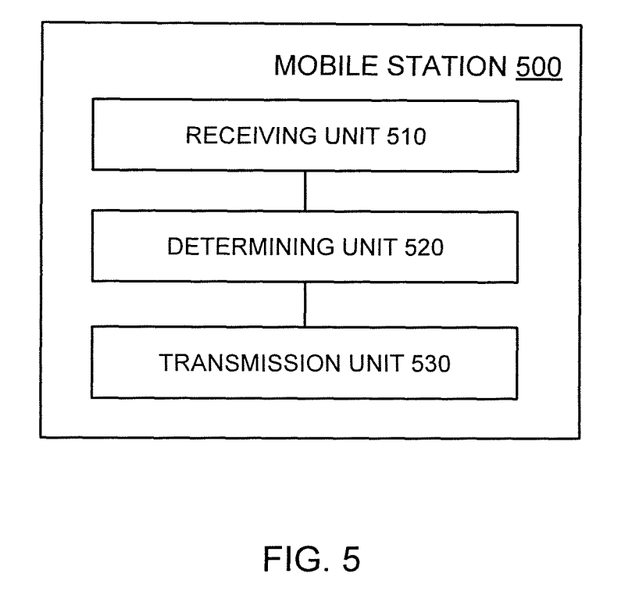
FIG. 5 is an exemplary block diagram to show a mobile station according to an embodiment of the present invention.

Now, a mobile station according to an embodiment of the present invention will be described below with reference to FIG. 5. FIG. 5 is a block diagram to show a mobile station 500 according to an embodiment of the present invention. As shown in FIG. 5, the mobile station 500 includes a receiving unit 510, a determining unit 520, and a transmission unit 530. Although the mobile station 500 may include other components in addition to these three units, these components are not related to the contents of the embodiment of the present invention, and therefore their illustration and explanation will be omitted here. Note that the specific details of the following operations executed by the mobile station 500 according to an embodiment of the present invention are the same as the details described earlier in the above text with reference to FIG. 1 to FIG. 2, so that, to avoid redundancy, the same details will not be described here again.

The receiving unit 510 receives basis beam reference signals transmitted from a base station. According to one example of the present invention, the base station can generate multiple groups of beams, and each group of beams may be comprised of a plurality of basis beams. The receiving unit 510 may receive basis beam reference signals for each basis beam in one group of beams. For example, a new codebook is created for basis beams which the base station can generate. Alternatively, basis beams which the base station can generate may be beams that correspond to existing codebooks (for example, codebooks in 3GPP standard release 13), which ensures excellent compatibility with existing codebooks.

Based on basis beam reference signals, the determining unit 520 determines a leading beam, and whether or not it is necessary to combine a beam. For example, the determining unit 520 measures each basis beam's channel state and/or others based on the basis beam reference signals, and, furthermore, selects the basis beam to show the best channel state as a leading beam, among a plurality of basis beams corresponding to the basis beam reference signals, based on the measurement results.

Note that, furthermore, whether or not it is necessary to combine the leading beam with another beam may be determined based on the measurement results. For example, if the measurement result of a leading beam shows that the channel state of the beam fulfils a predetermined channel state threshold, the determining unit 520 determines that there is no need to combine a beam. On the other hand, if the measurement result of a leading beam shows that the channel state of the beam does not reach the predetermined channel state threshold, the determining unit 520 determines that a beam needs to be combined, so that a beam to show a more suitable channel state for beam combining is acquired.

Then, the transmission unit 530 transmits basis beam information, which relates to the leading beam, and combination information, which relates to the combination of a beam, to the base station. According to one example of the present invention, basis beam information of the leading beam is the beam index of the leading beam.

Note that, for example, if the determining unit 520 determines that it is not necessary to combine a beam, the transmission unit 530 transmits basis beam information that relates to the leading beam and combination information to indicate that it is not necessary to combine a beam to the base station. Also, for example, if the determining unit 520 determines that a beam needs to be combined, the transmission unit 530 transmits basis beam information that relates to the leading beam, and combination information to indicate that it is necessary to combine a beam, to the base station.

According to another example of the present invention, when it is determined that it is necessary to combine a beam, the determining unit 520 further determines a secondary beam to combine with the leading beam and combination coefficients for the secondary beam.

As mentioned earlier, the base station can generate a plurality of groups of beams. The secondary beam to be determined by the determining unit 520 may be another basis beam in the same beam group as that of the leading beam. Alternatively, the secondary beam that is determined by the determining unit 520 and a leading beam may belong to different beam groups—that is, a basis beam in another beam group may be selected as a secondary beam.

Note that the combination coefficients of a secondary beam are coefficients for adjusting the secondary beam when the secondary beam is combined with a leading beam. For example, the coefficients for adjusting the secondary beam may include an amplitude coefficient and a phase coefficient for adjusting the amplitude and the phase of the secondary beam. For example, based on equation 1 above, the leading beam and the secondary beam may be combined, and the resulting beam may be fixed as the transmission beam.

Accordingly, the combination information related to combination of beams contains information about a secondary beam and its combination coefficients.

According to one example of the present invention, the combination information includes secondary beam information, which relates to a secondary beam to combine with a leading beam, and coefficient information, which relates to the secondary beam's combination coefficients. Similar to basis beam information that is associated with a leading beam, secondary beam information that is associated with a secondary beam may be the beam index of the secondary beam. Note that, for example, the coefficient information includes amplitude information and phase information. For example, the amplitude information represents the above-noted amplitude coefficient, and the phase information represents the above-noted phase coefficient.

In the present example, whether or not a beam needs to be combined is indicated by the amplitude information, that is, to indicate whether or not it is necessary to combine a beam, another indicator, apart from the amplitude information, needs not be provided in the combination information. To be more specific, if it is determined that there is no need to combine a beam, the amplitude information is made zero. When a beam needs not be combined, there is no need to report a secondary beam and parameters for adjusting the secondary beam to the base station, the transmission unit 530 transmits basis beam information and amplitude information, related to a leading beam, to the base station, thereby reporting, to the base station, a leading beam which the mobile station has selected, and to the effect that this leading beam needs not be combined with another beam. The mobile station does not have to transmit other pieces of information (for example, the secondary beam information and the phase coefficient) than the amplitude information in the combination information, to the base station. On the other hand, if it is necessary to combine a beam, the transmission unit 530 transmits the basis beam information related to the leading beam, secondary beam information, amplitude information and phase information, to the base station.

In this example, preferably, the transmission unit 530 may transmit the amplitude information and information other than the amplitude information in the combination information, separately. For example, the amplitude information is first transmitted, and then information other than the amplitude information in the combination information is transmitted. Therefore, the base station determines whether or not it is possible to receive information other than the amplitude information in the combination information, based on the amplitude information. Note that information other than the amplitude information in the combination information may be transmitted to the base station in a plurality of times. For example, the secondary beam information may be transmitted first, and then the phase information may be transmitted again.

According to another example of the present invention, the combination information includes combination indication information, which indicates whether or not it is necessary to combine a beam, secondary beam information, which relates to a secondary beam to combine with a leading beam, and coefficient information, which relates to the secondary beam's combination coefficients. When a beam needs not be combined, there is no need to report a secondary beam and parameters for adjusting the secondary beam, to the base station, the transmission unit 530 transmits basis beam information and combination indication information related to a leading beam, to the base station, thereby reporting, to the base station, a leading beam which the mobile station has selected, and to the effect that this leading beam needs not be combined with another beam. The mobile station does not have to transmit the combination information to the base station. On the other hand, if it is necessary to combine a beam, the mobile station transmits the basis beam information and combination indication information related to the leading beam, to the base station, and, furthermore, transmits secondary beam information and coefficient information (for example, amplitude information and phase information) to the base station.

In this example, preferably, the transmission unit 530 may transmit the combination indication information and information other than the combination indication information in the combination information, separately. For example, the combination indication information is transmitted first, and then information other than the combination indication information in the combination information is transmitted. Therefore, the base station determines whether or not it is possible to receive information other than the combination indication information in the combination information, based on the combination indication information. Note that information other than the combination indication information in the combination information may be transmitted to the base station in a plurality of times. For example, the secondary beam information and the amplitude information are transmitted first, and then the phase information is transmitted.

Note that, according to another example of the present invention, the transmission unit 530 transmits the combination information to the base station through a PUCCH and/or a PUSCH. Note that the combination information may be transmitted to the base station periodically or aperiodically, on an as-needed basis.

For example, the entire combination information may be transmitted to the base station through the PUCCH. To be more specific, the combination information may be transmitted in the PUCCH by using a PMI. As mentioned earlier, the combination information includes some or all of combination indication information, secondary beam information, amplitude information and phase information. The whole of the combination information may be transmitted using one PMI, or the whole of the combination information may be transmitted using a plurality of PMIs. For example, the combination indication information and/or the secondary beam information in the combination information are transmitted using the first PMI, and other pieces of information in the combination information are transmitted using a second PMI. Alternatively, similar to the method using the PUCCH, the entire combination information may be transmitted to the base station using the PUSCH.

Furthermore, a part of the information in the combination information may be transmitted to the base station using the PUCCH, and another part of the information in the combination information may be transmitted to the base station using the PUSCH. To be more specific, it is possible to transmit a part of the information in the combination information to the base station through the PUCCH, and transmit another part of the information in the combination information through the PUSCH. For example, when the combination information includes some or all of combination indication information, secondary beam information, amplitude information and phase information, the combination indication information and/or the secondary beam information in the combination information are transmitted through the PUCCH, and the rest of the information in the combination information is transmitted through the PUSCH.

Note that, in order to prevent a beam addressed to one mobile station and a beam addressed to another mobile station from colliding, the base station may report to the mobile station beams that are limited in use, by sending beam limiting information to the mobile station. In this case, the receiving unit 510 receives beam limiting information transmitted from the base station, and the beam limiting information here indicates a beam whose use is limited. Note that the mobile station may further include a correlation coefficient acquiring unit to determine the correlation coefficient between the secondary beam that is determined and the limited beam indicated by the beam limiting information. For example, correlation coefficient is determined based on above equation 2.

When the correlation coefficient is larger than a predetermined value, according to one example of the present invention, the transmission unit 530 transmits basis beam information relating to a leading beam, and combination information indicating that a beam is not to be combined, to the base station. Alternatively, according to another example of the present invention, the determining unit 520 re-selects the secondary beam to combine with a leading beam, and determines the combination coefficients of the re-selected secondary beam again. Accordingly, the transmission unit 530 transmits basis beam information related to a leading beam, secondary beam information related to the secondary beam that is re-selected and coefficient information related to the combination coefficients of the re-selected secondary beam to the base station.

The mobile station according to the present embodiment allows determining a leading beam based on a basis beam reference signal first, then determining whether this leading beam needs to be combined with another beam, and feeding back the determined result to a base station. Consequently, even in the massive MIMO system with a larger number of antennas, the base station can acquire, in a reliable manner, the beams which the base station can use then and subsequently to communicate with a mobile station, without even allowing the signaling overhead for beam measurements to increase accompanying the increase of the number of antennas. Note that, if the basis beam is a beam that corresponds to an existing codebook, excellent compatibility with the existing codebook is ensured.

Note that, according to another example of the present invention, the determining unit 520 may determine a plurality of leading beams. In this case, whether or not each leading beam needs to be combined with a beam is determined, and when a leading beam needs to be combined with a beam, a secondary beam to be combined with the leading beam and combination coefficients for the secondary beam are determined.

Figure 6:
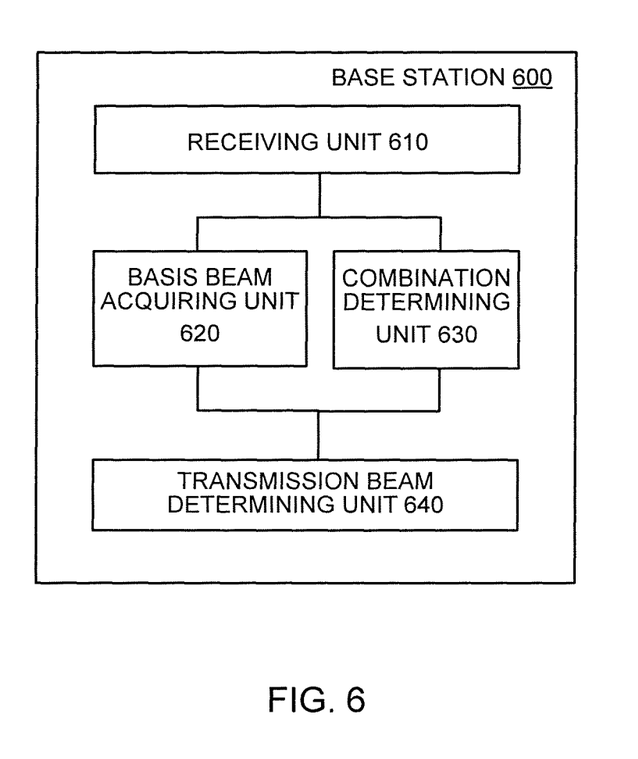
FIG. 6 is an exemplary block diagram to show a base station according to an embodiment of the present invention.

Now, a base station according to an embodiment of the present invention will be described below with reference to FIG. 6. FIG. 6 is an exemplary block diagram to show a base station 600 according to an embodiment of the present invention. As shown in FIG. 6, the base station 600 includes a receiving unit 610, a basis beam acquiring unit 620, a combination determining unit 630, and a transmission beam determining unit 640. Although the base station 600 may include other components in addition to these four units, these components are not related to the contents of the embodiment of the present invention, and therefore their illustration and explanation will be omitted here. Note that the specific details of the following operations executed by the base station 600 according to an embodiment of the present invention are the same as the details described earlier in the above text with reference to FIG. 3 to FIG. 4, so that, to avoid redundancy, the same details will not be described here again.

The receiving unit 610 receives the basis beam information and the combination information transmitted from the mobile station. For example, the basis beam information and the combination information are generated by the mobile station based on basis beam reference signals transmitted from the base station. The basis beam information and the combination information have been described above in detail, with reference to FIG. 1 and FIG. 2, and so their explanation will be omitted here.

The basis beam acquiring unit 620 acquires a leading beam based on the basis beam information, and, the combination determining unit 630 determines whether or not it is necessary to combine a beam, based on the combination information. Then, if it is not necessary to combine a beam, the transmission beam determining unit 640 determines the leading beam as the transmission beam for the mobile station. In the subsequent data transmission process, data is communicated to the mobile station using the leading beam.

Figure 7:
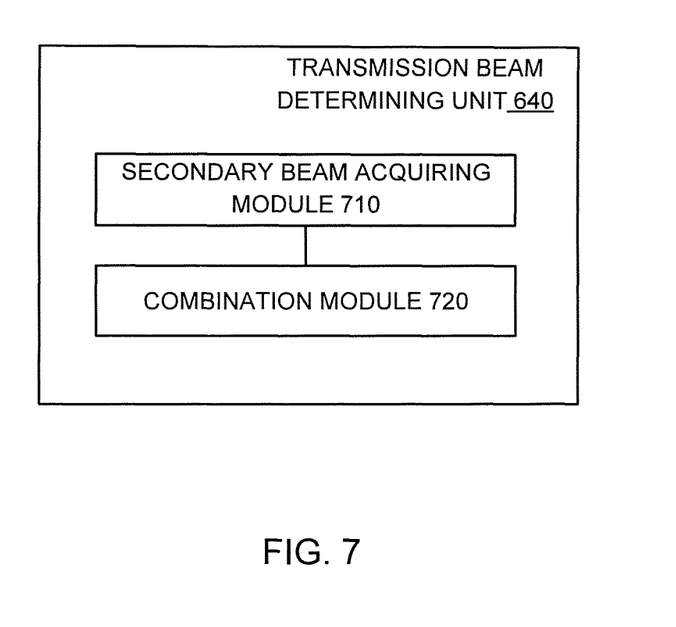
FIG. 7 is a block diagram to show a transmission beam determining unit according to one example of the present invention.

On the other hand, when it is necessary to combine a beam, the transmission beam determining unit 640 combines the leading beam with another beam. FIG. 7 is an exemplary block diagram to show a transmission beam determining unit according to one example of the present invention. As shown in FIG. 7, the transmission beam determining unit 640 includes a secondary beam acquiring module 710 and a combination module 720. The secondary beam acquiring module 710 acquires a secondary beam and the secondary beam's combination coefficients based on the combination information. Then, the combination module 720 acquires a transmission beam for the mobile station based on the leading beam, the secondary beam and the secondary beam's combination coefficients. As described above, the combination coefficients include an amplitude coefficient and a phase coefficient. For example, a transmission beam is acquired by combining the leading beam and the secondary beam according to equation 1 above.

As described earlier, in the combination information, the mobile station first transmits information that indicates whether or not it is necessary to combine a beam, and when it is necessary to combine a beam, the mobile station may transmit the rest of the information in the combination information after sending the information indicating whether or not it is necessary to combine a beam. Accordingly, the receiving unit 610 receives the information to indicate whether or not it is necessary to combine a beam. If the combination determining unit 630 determines that it is not necessary to combine a beam, the base station determines that it is not necessary to receive the rest of the information in the combination information, and that it is not necessary to combine a beam based on the rest of the information in the combination information. On the other hand, if the combination determining unit 630 determines that a beam needs to be combined, the base station determines that it is necessary to receive the rest of the information in the combination information, and the combination determining unit 630 needs to combine a beam based on the rest of the information in the combination information.

Note that, preferably, the base station shown in FIG. 6 may further include a transmission unit. The transmission unit reports beams that are restricted in use to the mobile station by transmitting beam limiting information to the mobile station before the basis beam information and the combination information transmitted from the mobile station are received in the receiving unit 610. The mobile station generates the basis beam information and the combination information taking into account the beam limiting information, so that a beam for the mobile station and a beam for another mobile station are prevented from colliding.

The base station of the present embodiment, receives basis beam information and combination information, which are generated by a mobile station based on basis beam reference signals, determines a leading beam and whether or not this leading beam needs to be combined with another beam, and, furthermore, determines the transmission beam for the mobile station. Consequently, even in the massive MIMO system with a larger number of antennas, the base station can acquire, in a reliable manner, the beams which the base station can use then and subsequently to communicate with the mobile station, without even allowing the signaling overhead for beam measurements to increase accompanying the increase of the number of antennas. Note that, if a basis beam is a beam that corresponds to an existing codebook, excellent compatibility with the existing codebook is ensured.

The operations of the above-described mobile station 500 and base station 600 may be implemented with hardware, may be implemented with software modules that are executed on a processor, or may be implemented with combinations of both. For example, the determining unit in the mobile station may be implemented in software modules executed on a processor. Also, for example, the basis beam acquiring unit, the combination determining unit and the transmission beam determining unit in the base station may be implemented in software modules executed on a processor.

The software modules may be stored in any form of storage medium, such as, for example, a RAM (Random Access Memory), a flash memory, a ROM (Read Only Memory), an EPROM (Erasable Programmable ROM), an EEPROM (Electrically Erasable Programmable ROM), a register, a hard disk, a removable disk and a CD-ROM.

Such a storage medium may be connected to a processor, so that the processor can write information into or read information from the storage medium. This storage medium may be stacked in the processor. These storage medium and processor may be arranged in an ASIC. This ASIC may be arranged in the mobile station 500 and the base station 600. These storage medium and processor may be located in the mobile station 500 and the base station 600 as independent units.

Now, the present invention has been described in detail with reference to the above embodiments. However, it should be understood by those skilled in the art that the present invention is not limited to the embodiments described herein. The present invention may be implemented in examples modified or changed under the circumstances such modifications and changes do not depart from the scope of the present invention defined by claims. Accordingly, the description in this specification is only intended to be interpreted as an illustration and does not add any restrictive meaning to the present invention.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal that reports channel state information to a base station, the terminal comprising:
   a receiver that receives basis beam reference signals, each included in one or a plurality of basis beams transmitted from the base station;
   a processor that determines a leading beam and a secondary beam to combine with the leading beam, based on the received basis beam reference signals; and a transmitter that transmits combination information about combination of the leading beam and the secondary beam, to the base station by using a precoding matrix indicator, wherein the combination information includes secondary beam information related to the secondary beam and coefficient information related to the secondary beam, wherein the coefficient information includes amplitude information and phase information, wherein, when the secondary beam is not combined with the leading beam, the amplitude information can be set to zero, and wherein the combination information includes the amplitude information indicating whether it is necessary to combine the secondary beam with the leading beam.

2. A base station, comprising:

a receiver that receives combination information about combination of a leading beam and a secondary beam indicated by using a precoding matrix indicator and transmitted from a terminal; and a processor that determines a transmission beam for the terminal, combining the leading beam and the secondary beam, based on an amplitude information indicating whether it is necessary to combine the secondary beam with the leading beam included in the combination information received, wherein, when the amplitude information of the secondary beam included in the combination information is zero, the processor determines the leading beam as the transmission beam.

3. A communication method for reporting channel state information to a base station, comprising:

receiving basis beam reference signals, each included in one or a plurality of basis beams transmitted from the base station;

determining a leading beam and a secondary beam to combine with the leading beam, based on the basis beam reference signals received; and transmitting combination information about combination of the leading beam and the secondary beam, to the base station by using a precoding matrix indicator, wherein the combination information includes secondary beam information related to the secondary beam and coefficient information related to the secondary beam, wherein the coefficient information includes amplitude information and phase information, wherein, when the secondary beam is not combined with the leading beam, the amplitude information can be set to zero, and wherein the combination information includes the amplitude information indicating whether it is necessary to combine the secondary beam with the leading beam.

4. A communication method comprising:

receiving combination information about combination of a leading beam and a secondary beam transmitted from a terminal; and determining a transmission beam for the terminal, combining the leading beam and the secondary beam, based on an amplitude information indicating whether it is necessary to combine the secondary beam with the leading beam included in the combination information received, wherein, when the amplitude information of the secondary beam included in the combination information is zero, the leading beam is determined as the transmission beam.

* * * * *